(12) United States Patent
Mellott et al.

(10) Patent No.: US 6,789,380 B2
(45) Date of Patent: Sep. 14, 2004

(54) SPIRAL WRAPPER FOR CONDUIT DUCTS

(76) Inventors: Gene Mellott, P.O. Box 278, Isabella, MO (US) 65676; Michael Lee, 4262 Woodmere Ave., Youngstown, OH (US) 44515

( * ) Notice: Subject to any disclaimer, the term of this patent is extended or adjusted under 35 U.S.C. 154(b) by 10 days.

(21) Appl. No.: 09/999,809

(22) Filed: Oct. 24, 2001

(65) Prior Publication Data

US 2003/0074878 A1 Apr. 24, 2003

(51) Int. Cl.[7] .................................................. D07B 7/14
(52) U.S. Cl. ...................................... 57/10; 57/6; 57/18
(58) Field of Search ................................ 57/3, 6, 9, 10, 57/12–18

(56) References Cited

U.S. PATENT DOCUMENTS

| | | | |
|---|---|---|---|
| 3,059,404 A | * | 10/1962 | Benfer et al. |
| 3,344,592 A | * | 10/1967 | Geisinger |
| 4,346,550 A | * | 8/1982 | Ferree |
| 4,461,429 A | * | 7/1984 | Goekler et al. |
| 4,628,681 A | * | 12/1986 | Vanderpyl et al. |
| 4,640,086 A | * | 2/1987 | Levino |
| 5,765,357 A | * | 6/1998 | Burgess et al. |
| 6,490,852 B1 | * | 12/2002 | Mustacich et al. |

* cited by examiner

Primary Examiner—John J. Calvert
Assistant Examiner—Shaun R Hurley
(74) Attorney, Agent, or Firm—Clifford A. Poff

(57) ABSTRACT

A bundle of conduit ducts is supplied by reels to a tandem arrangement of a pattern unit, a supply roller unit, an applicator unit and a delivery roller unit all supported by a wheeled base. The pattern unit has rows of discrete apertures for delivering conduit ducts at spatial positions. The supply roller unit and delivery roller unit each have spaced apart rollers supported by carriers in a frame to define a predetermined geometric passageway. The supply roller unit organizes the conduit ducts and the delivery roller unit supports a wrapped conduit ducts passed from the applicator unit. The applicator unit has a frame to support a rotator driven by a motor for rotation about a central axis extending perpendicular to the plane of rotation by the rotator. The rotator supports two reels one containing adhesive tape and the other metal wire on arbors at diametrically opposed locations. Binder guides extend radially toward the conduit ducts as advanced through the internal passageway of the rotator for directing the binders to wrap in a spiral fashion about the conduit ducts.

18 Claims, 6 Drawing Sheets

SPIRAL WRAPPER FOR CONDUIT DUCTS

CROSS-REFERENCE TO RELATED APPLICATIONS

Not applicable

BACKGROUND OF THE INVENTION

1. Field of the Invention

This invention relates to the organizing and maintaining the organized arrangement of cable ducts used to protectively house utility cables along a subterranean plantation site and more particularly the present invention relates to apparatus spiral wrap a bundle of such conduct ducts after the ducts are organized into a predetermined bundle formation.

2. Description of the Prior Art It is well known to place telephone communication cable and electric utility cable under ground along a course to service consumers. It is a common practice to place the cable in a buried cable duct to protect the cable from adverse conditions at the placement site and to allow replacement of the utility cable without the need expose the sub-grade along the intended course of underground placement. The placement of cable particularly along a utility corridor usually requires creating a trench of a width and depth sufficient to accommodate the collection of cable duct and then back fill the trench to form an earth barrier of protection. The cable duct usually does not contain cable when placed in the trench but the cable is installed at a later time. Well known forms of the cable include light guide cable for telecommunications and shielded metal conduits for an electrical utility. A relatively large number of cable ducts are usually placed in the trench particularly when the course of the installation is in a utility corridor. The cable ducts are relatively light weight per unit of length as compared to metal sheath cable. Well known composition of the cable duct consist of plastic material made with sufficient plasticizer to impart needed flexibility to the duct for accommodating undulations of the trench bottom. The flexibility of the conduits and made with polyethylene material to impart low friction characteristics complicates the placement operation due to the unstable nature of the collection of cable ducts in the trench. Identifying particular cable ducts to complete the installation of cable particularly for branching at junction areas of the ducts is time consuming particularly due to the unorganized relation to the cable ducts in the trench.

Accordingly, it is an object of the present invention to provide an apparatus to spiral wrap a bundle of conduits incident to subterranean placement of the bundle of conduit ducts.

It is a further object of the present invention to provide an apparatus embodying a robust design of component parts sufficient for allowing traveling movement of the apparatus along a trenching site to spiral wrap a multiplicity of conduit ducts for immediate placement in an exposed trench and allow back filling of the trench without unearthed displacement to any of the conduit ducts.

It is a further object of the present invention to provide a tandem arrangement of a pattern, supply roller, applicator and delivery roller units to form a bundle of conduit ducts with a predetermined geometric configuration and spiral wrap the bundle for subterranean placement.

It is another object of the present invention to establish a predetermined conduit identification for a geometric configuration of conduit ducts and provide a pattern, supply roller and applicator units to arrange conduit ducts according to the predetermined geometric configuration and spiral wrap the conduit ducts for subterranean placement.

SUMMARY OF THE INVENTION

According to the present invention there is provided an apparatus to apply a spiral wrap to a bundle of conduit ducts, the apparatus including a frame rotatably supported by a rotator driven by a drive for rotation about a central axis extending perpendicular to the plane of rotation by the rotator, the rotator having an internal passageway of a size sufficient for the internal passage of an elongated bundle of conduit ducts arranged in a preestablished geometrical array along the axis which is generally parallel with the extended length of the elongated bundle of conduit ducts, a tape support arbor secured to the rotator for rotatably supporting binding tape, the tape support arbor being driven by the rotator in an orbit about the axis, and a tape guide supported by the arbor to extend generally radially toward a geometrical array of conduit ducts as advanced through the internal passageway of the rotator for directing the binding tape from the tape support arbor to wrap in a spiral fashion about the outer periphery of the bundle of conduit ducts.

A further aspect of the present invention provides an apparatus to spiral wrap a bundle of conduit ducts, the apparatus including a tandem arrangement of a pattern unit, a supply roller unit, an applicator unit and a delivery roller unit supported by a base, the pattern unit having a frame supporting vertically spaced apart slats forming horizontal rows of generally rectangular slots subdivided by vertical walls to form rows of discrete apertures for delivering conduit ducts at spatial positions, each of the supply roller unit and delivery roller unit having a frame supporting spaced apart upper and lower carriers and spaced apart lateral carriers with each carrier rotatably supporting a roller, the rollers of the carriers being positioned by the carriers to define a predetermined geometric passageway bounded by opposed rollers, the supply roller unit organizing conduit ducts received from the pattern unit to conform to the geometric passageway and the delivery roller unit supporting a geometric array of wrapped conduit ducts discharged from the applicator unit, and the applicator unit having a frame rotatably supported by a rotator driven by a drive for rotation about a central axis extending perpendicular to the plane of rotation by the rotator, the rotator having an internal passageway of a size sufficient for the internal passage of an elongated bundle of conduit ducts arranged in a preestablished geometrical array along the axis which is generally parallel with the extended length of the elongated bundle of conduit ducts, a tape support arbor secured to the rotator for rotatably supporting binding tape, the tape support arbor being driven by the rotator in an orbit about the axis, and a tape guide supported by the arbor to extend generally radially toward a geometrical array of conduit ducts as advanced through the internal passageway of the rotator for directing the binding tape from the tape support arbor to wrap in a spiral fashion about the outer periphery of the bundle of conduit ducts.

BRIEF DESCRIPTION OF THE SEVERAL VIEWS OF THE DRAWINGS

The present invention will be more fully understood when the following description is read in light of the accompanying drawings in which.

DETAILED DESCRIPTION OF THE INVENTION

Figure 1:
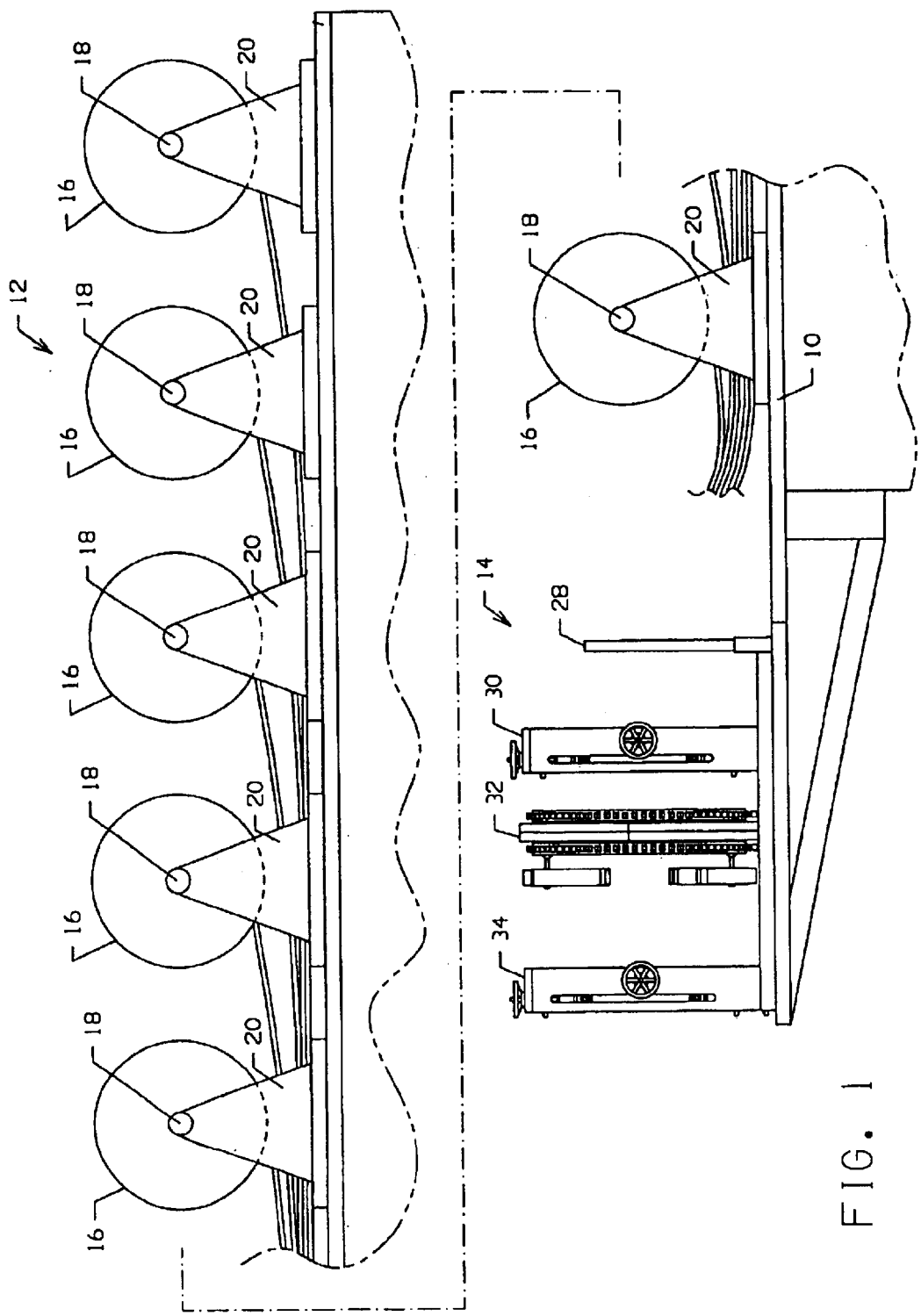
FIG. 1 is a schematic elevational view of a platform containing spiral wrap apparatus for cable duct supplied from storage reels according to the present invention.

In FIG. 1 there is illustrated an arrangement of apparatus mounted on an elongated platform 10 and embodying the present invention to spiral wrap a bundle of conduit ducts, sometimes called interducts in this field of art. Conduit ducts particularly as used in the telecommunications industry are supplied in a variety of colors. When conduit ducts are used in a single placement site different colors are selected for the purpose of identifying and differentiating the communication cable when placed in the conduit ducts. The present invention allows the identification and differentiation of the utility cable on the basis of both of the color of the conduit duct containing the cable and the position of the conduit duct in a predetermined geometrical configuration which is spiral wrapped to maintain the bundle configuration of conduit ducts. This method for establishing the identity of conduits in a bundle is particularly advantageous when the number of required conduit ducts used in a single placement site exceed the number of available colors of the conduit ducts.

The platform may conveniently take the form of the bed portion of a heavy duty trailer which can be pulled by a tractor or other suitable land vehicle along course in close proximity to the intended subterranean placement site for a newly formed bundle of conduit ducts. A storage rack 12 is mounted at a site located at the leading end of the elongated platform 10 and at a spaced apart relation from spiral wrap apparatus 14 preferably located at the rear of the platform for conveniently depositing the continuously formed bundle of conduit ducts either directly into an suitable trench or along the course of a trench. In the particular example shown in FIG. 1, the storage rack 12 rotatably supports a total of twelve storage reels 16 arranged in any desired manner and it is to be understood that in FIG. 1 there are six pairs of side by side reels. Each pair of reels is rotatably supported by an axel 18 mounted in bearings on spaced apart pairs of pedestals 20. Lower pairs of pedestals 20 are mounted on the platform 10 and upper pairs of pedestals are mounted on a base supported by support posts at an elevation above the lower pairs of reels. The conduct ducts are continuously paid out from the reels toward the spiral wrap apparatus 14 for organizing the collection of conduct ducts into a bundle having a predetermined geometrical configuration. The present invention is particularly useful in combination with the orientation of the colors of the conduit ducts for identification a particular cable in the bundle of ducts. Thus, it is essential to maintain the integrity of the geometrical configuration by the use of the spiral wrapping at least until backfilling of the trench provides a permanent restraint along the length of the bundle of conduit ducts.

Figure 3:
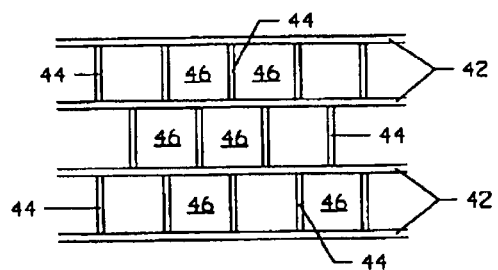
FIG. 3 is a enlarged fragmentary front elevational view of a pattern unit forming part of the apparatus shown in FIG. 2.
Figure 2:
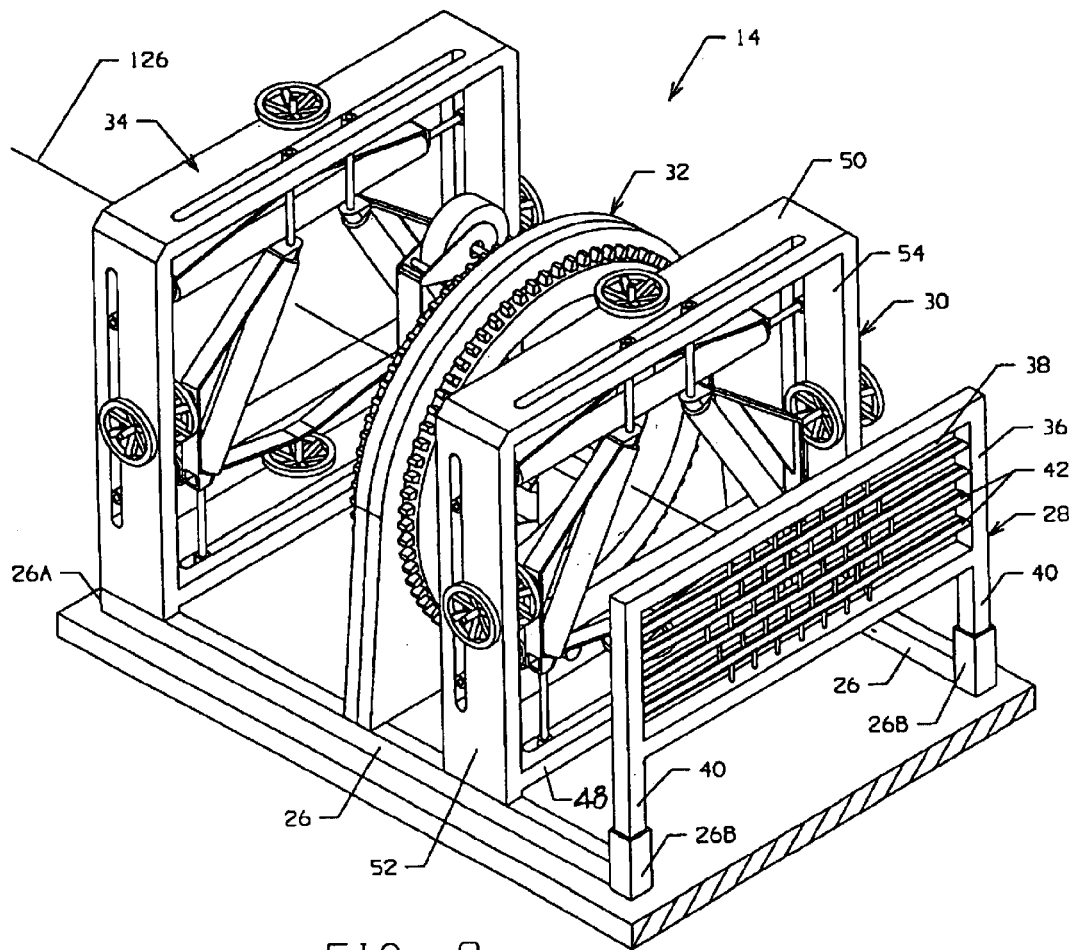
FIG. 2 is a isometric illustration of tandem arranged apparatus for spiral wrapping a bundle of cable ducts.
Figure 7:
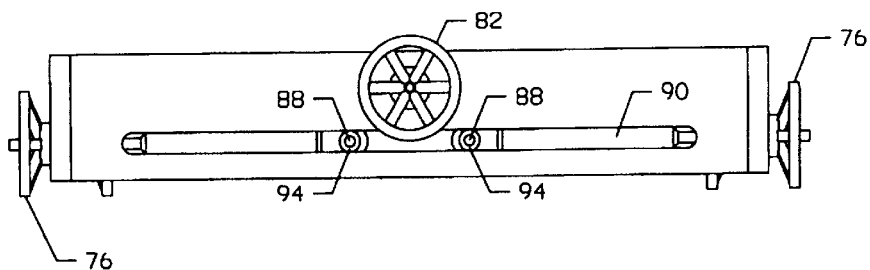
FIG. 7 is a top plan view taken along lines VII—VII of FIG. 5.

The spiral wrap apparatus 14 is shown in greater detail in FIGS. 2 and 3 and includes spaced side rails 26 for securing in a spaced apart relation a tandem arrangement of a pattern unit 28, a supply roller unit 30; an applicator unit 32; and a delivery roller unit 34. The pattern unit receives the collection of a conduit ducts as paid out form the storage reels 16. The pattern unit includes a rectangular frame 36 forming a window opening 38 and provided with legs 40 supported by the rails 26. Horizontal slats 42 are supported in a spaced apart relation in a window 38 by the frame 36 to form horizontal rows of rectangular slots which are secured to and subdivided by vertical walls 44 to form rows of discrete apertures 46. Each conduit duct is segregated from the other conduit ducts to establish an ordered, spaced apart arrangement for the ducts as they are advance to the supply roller unit 30 where they are condensed to produce a predetermined geometrical array of conduit. The horizontal slats 42 and vertical walls 44 of supply roller unit are preferably made of stainless steel, ⅜" round stock, to form the discrete apertures 46 made with a square configuration. The sides of the squares should be 1 ¾ inches to form an ideal opening for 1 ⅝ inches outside diameter conduit duct. The square openings in one horizontal row are off set from the square openings in the adjoining horizontal rows to assure that one conduit duct is nested between contacting adjacent conduit ducts. As the conduit ducts pass through discrete apertures 46 and into the supply roller unit 30 the conduit ducts assume nested positions established by the supply roller unit 30 for wrapping together. The pattern unit 28 is readily interchangeable with a different pattern unit to provide a different ordered, spaced apart arrangement for the conduit ducts.

Figure 4:
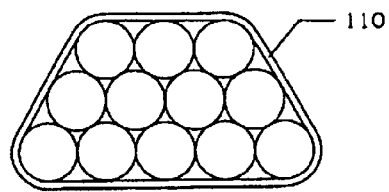
FIG. 4 is a sectional view of one arrangement of spiral wrap cable duct taken transversely of the extended length of the bundle.
Figure 5:
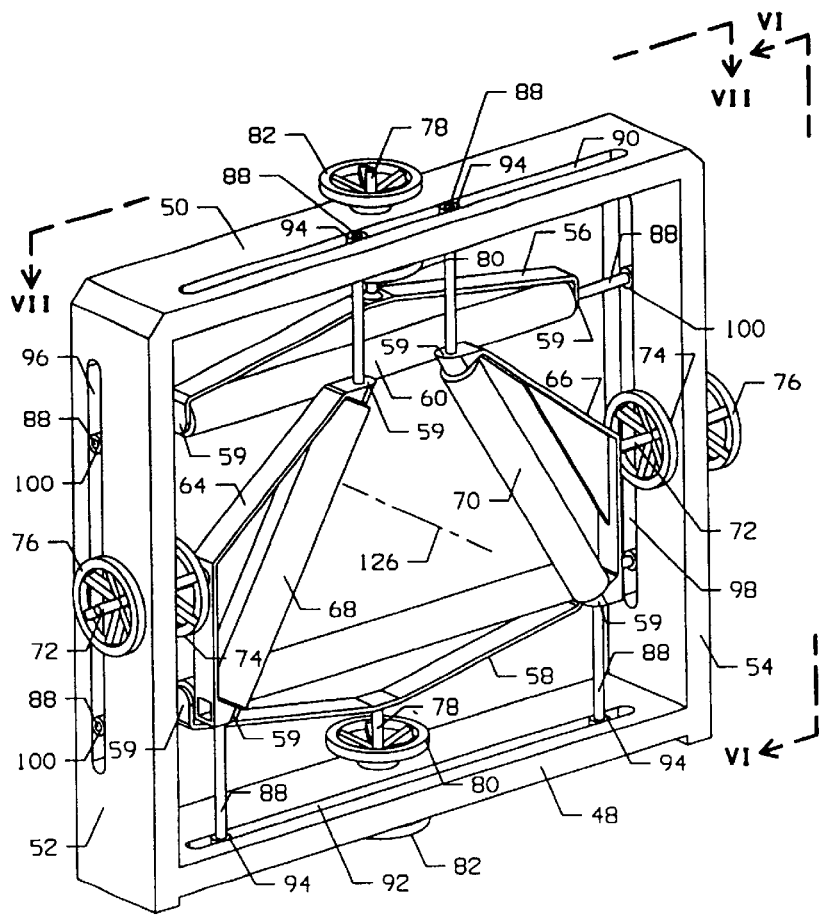
FIG. 5 is an enlarged isometric view of one embodiment of a supply roller unit which when incorporated of the apparatus of the present invention is the same as the delivery roller unit.

The supply roller unit 30, as shown in FIGS. 3–5, includes a rectangular frame defining a window formed by bottom, top, left and right limbs 48, 50, 52 and 54 respectively. In the window of the frame are opposed upper and lower carriers 56 and 58, respectively, each having a bearing assembly 59 mounted on the terminal ends of the carriers and rotatably supporting upper and lower rollers 60 and 62, respectively. Laterally offset from the carriers 56 and 58 are opposed left and right carriers 64 and 66, respectively, each having a bearing assembly 59 mounted on the terminal ends of the carriers and rotatably supporting left and right roller 68 and 70, respectively. Each of the left and right carriers 64 and 66 has long and short carrier components joined in an angular relation with the shorter carrier component extending parallel with the adjacent side limb and the long carrier component extending at an obtuse angle to the short carrier component. At a point near the junction of the two carrier components, there is secured to the shorter carrier component a threaded shaft 72 engaged with the threads in a hub of a hand wheel 74. The shaft 72 extends through an opening in the side limb so that a protruding end portion engages with threads in a hub of a hand wheel 76. The hand wheels 74 and 76 are rotated in directions to move the shaft 72 in an axial direction to position the rollers supported by the carrier thereof at a desired location to define opposite and nonparallel lateral sides of a geometrical passageway. The angular relation between the carrier components is chosen to produce an angular relation between the rotational axes of the left and right rollers 68 and 70 to form angling opposed sides of a truncated triangular passageway which imparts a corresponding configuration to the bundle of conduit ducts passed through the supply roller unit 28. Each of the top and bottom carriers 56 and 58 has equal length carrier components joined and extending in the same in an angular relation from a central point at the junction of the two carrier components where there is secured to the carrier components a threaded shaft 78 engaged with threads in the hub of a hand wheel 80. Each shaft 78 of the top and bottom carriers extends through openings in the top and bottom side limbs 48 and 50 respectively so that each protruding end portion engages with threads in the hub of a hand wheel 82. The hand wheels 80 and 82 are rotated in directions to move the shaft 78 in an axial direction to position the upper and lower rollers 60 and 62 supported by the carriers thereof at a desired location to define opposite and parallel lateral sides of the truncated triangular passageway.

Four sides of the truncated triangular passageway as shown in FIG. 4 are thus formed by the relative positions of each of the upper roller 60, lower roller 62, left roller 68 and right roller 70 which confines the twelve conduit ducts into the compact bundle. A shaft 88 is secured to each bearing assembly 59 of each of the upper right 60, lower right 62, lower roller 68 and right roller 70. The shafts 88 associated with the bearing of upper roller 60 and lower roller 62 extend in a parallel relation into elongated slots 90 and 92 in the top and bottom limbs 48 and 50, respectively. The slots 90 and 92 support bearing blocks 94 fitted on the ends of the shafts 88 to stabilize and allow movement along the slots when the positions of upper roller 60 and lower roller 62 are changed. The shafts 88 associated with the bearings of the left roller 68 and the right roller 70 extend in a coaxial relation with the rotational axis of rollers and extend in slots 96 and 98 in the left and right limbs respectively, The slots 96 and 98 containing bearing block 100 fitted on the ends of the shafts to stabilized and allow movement along the slots when the positions of left roller 68 and the right roller 70 are changed.

Figure 6:
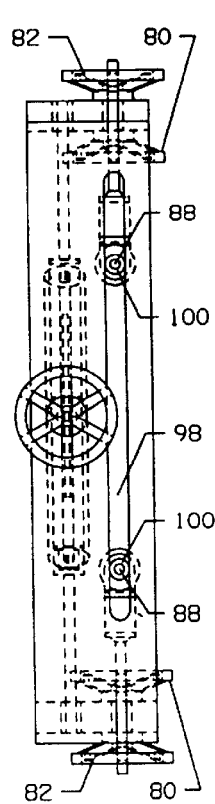
FIG. 6 is a side elevational view taken along lines VI—VI of FIG. 5.
Figure 8:
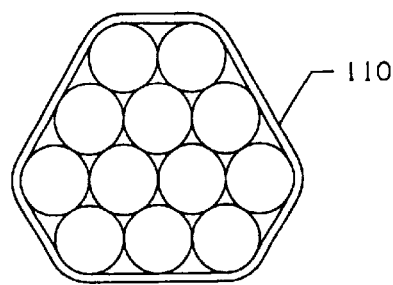
FIG. 8 is a sectional view of a second arrangement of spiral wrap cable duct taken transversely of the extended length of the bundle.
Figure 9:
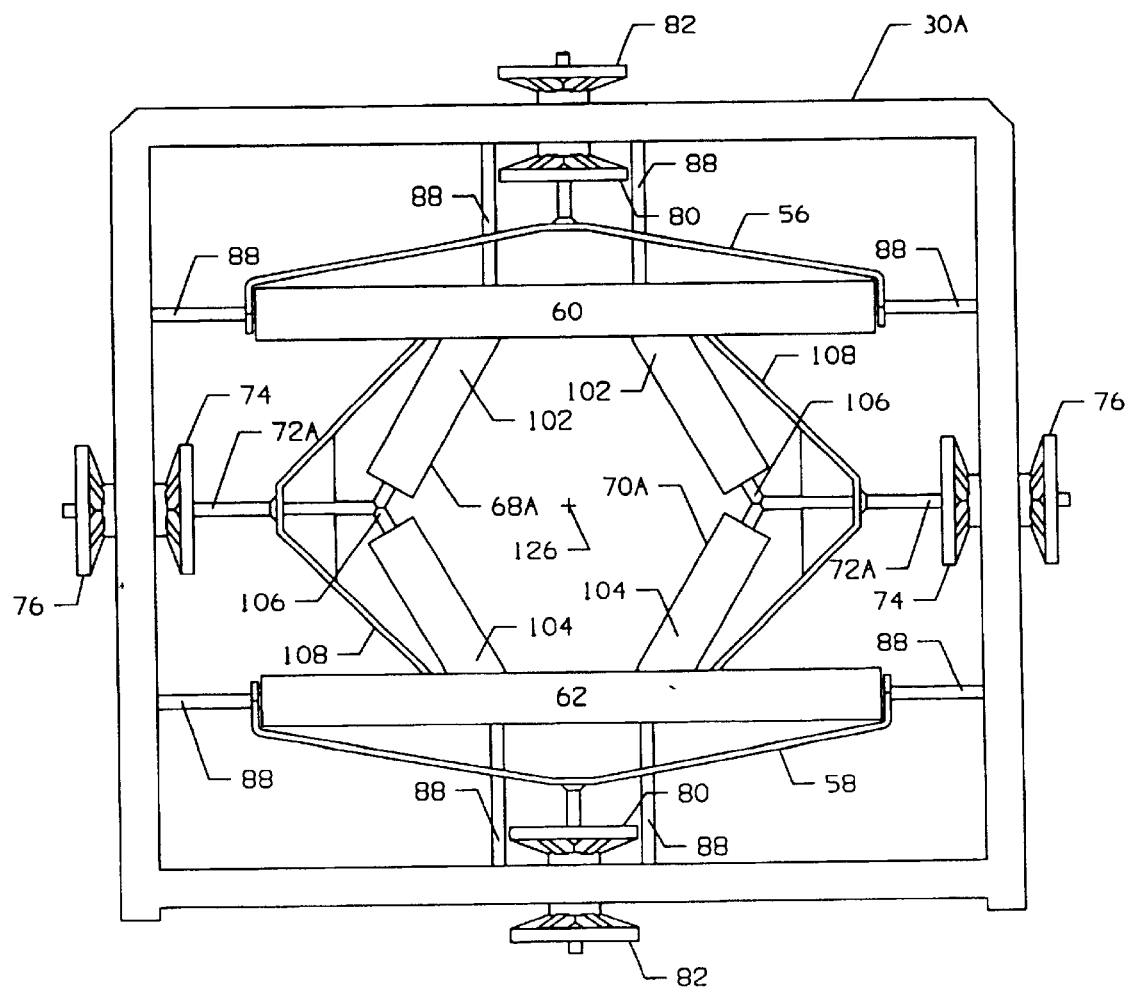
FIG. 9 is a front elevational view of a second embodiment of a supply roller unit which when incorporated in the apparatus of the present invention is the same as a delivery roller unit.
Figure 11:
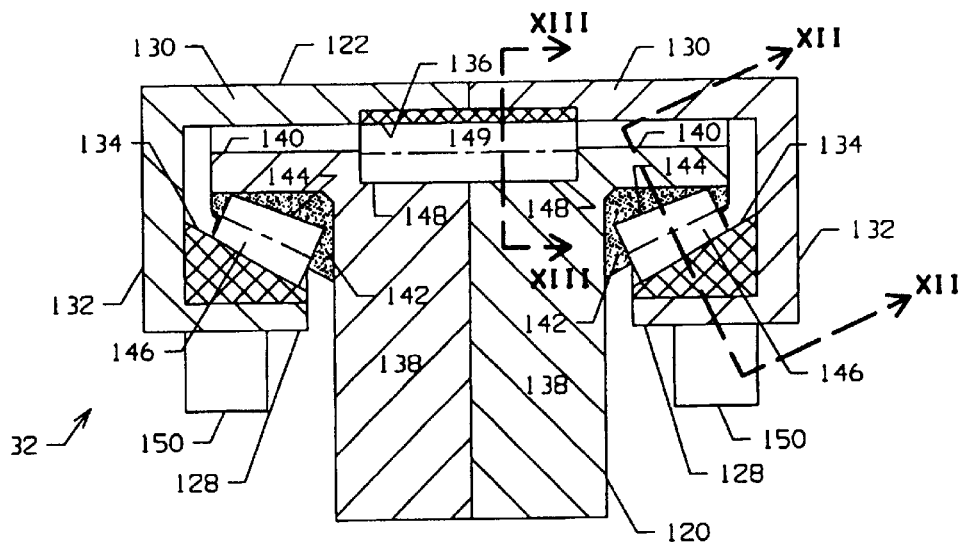
FIG. 11 is a sectional view taken along lines XI—XI of FIG. 10.
Figure 10:
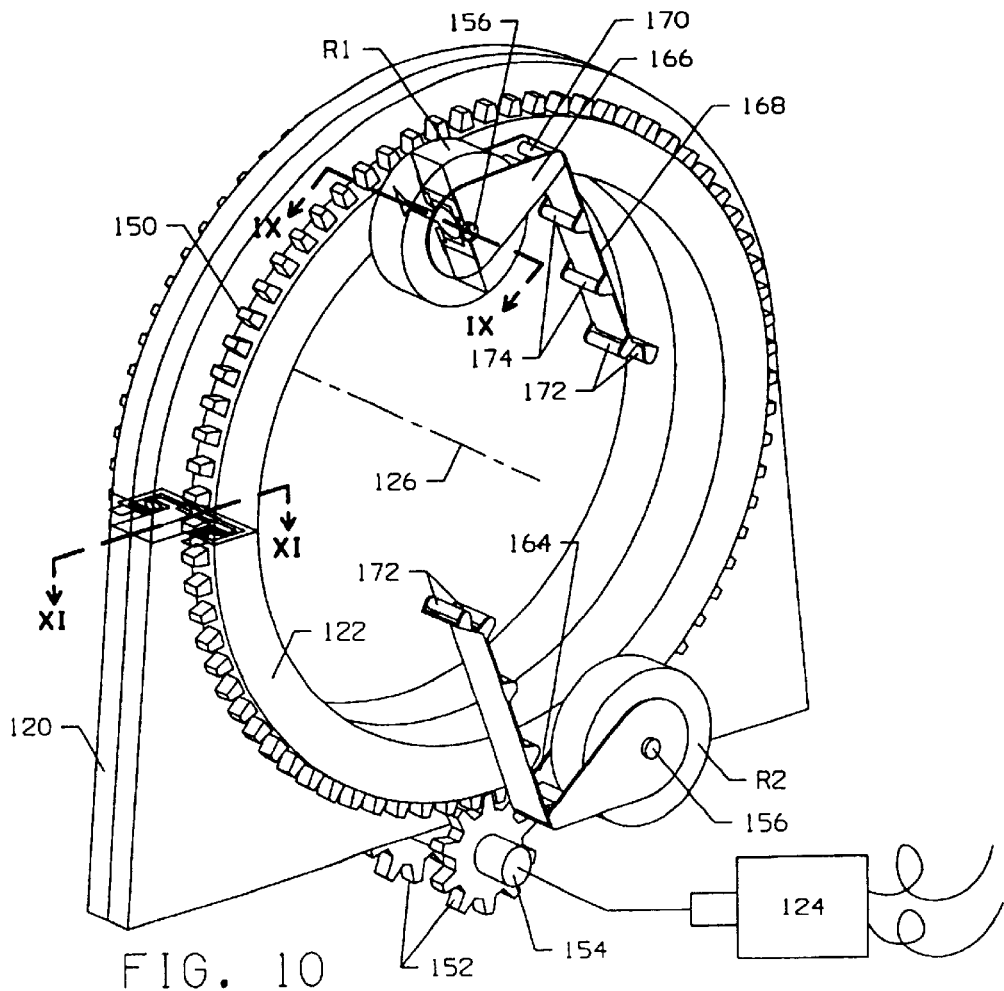
FIG. 10 is an enlarged isometric view of the applicator unit to apply a spiral wrap to a bundle of conduit ducts according to the present invention.
Figure 12:
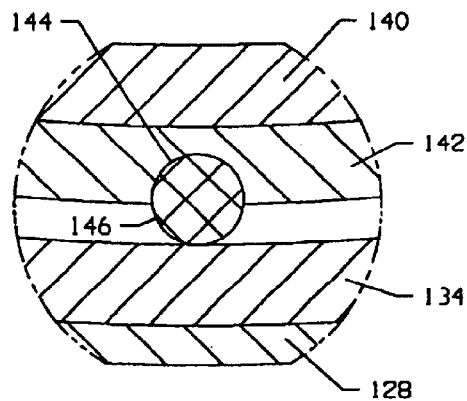
FIG. 12 is a sectional view taken along lines XII—XII of FIG. 11.
Figure 13:
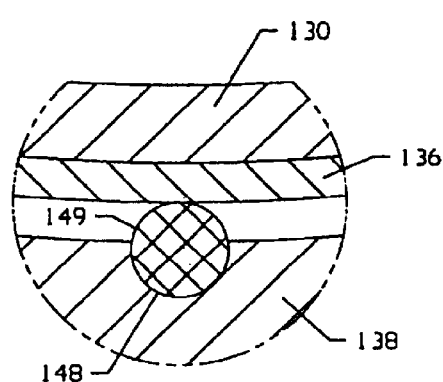
FIG. 13 is a sectional view taken along lines XIII—XIII of FIG. 11.

FIG. 9 illustrates a second embodiment of a supply roller unit 30A which differs from the supply roller unit 30 by the construction of a left roller 68A and right roller 70A. Like components in FIG. 9 and FIGS. 5–6 are identified by the same reference numerals and the descriptions of the components are equally applicable. Each of the rollers 68A and 70A are identically constructed and include two component rollers 102 and 104 having roller shafts joined by articulated connectors 106. The free ends of the component rollers 102 and 104 are rotatably support by bearings assembles 59 joined with an end of a carrier 108 which has equal length carrier components joined and extending in the same angular relation from a central point at the junction of the two carrier components. At this junction a threaded shaft 72A is secured to the carrier components. The shaft 72A is engaged with the threads in a hub of the hand wheel 74. The rollers 60, 62, 68A and 70A define the bounders of a geometric passageway as polygon having six sides which confines the twelve conduit into a compact stack with the outline of a hexagon as shown in FIG. 8.

In FIGS. 4 and 8, each of the bundles of conduit ducts contains an outer wrap of a tape 110 to maintain the geometrical configuration as described hereinbefore. The tape 110 is applied by the applicator unit 32 which is shown in FIGS. 10–14 and includes a frame 120 used to rotatably support a rotator 122 having the shape of a circular ring sector and driven by a drive motor 124 for rotation about an axis 126 which passes through the center of the circular ring sector configuration of the rotator 122. The ring sector configuration of the rotator forms an internal passageway of a size sufficient for the internal passage of an elongated bundle of conduit ducts along a path of travel is generally parallel with the axis 126 and the extended length of the elongated bundle of conduit ducts.

The rotator 122 includes two rings joined by fasteners, not shown, to form a unitary rotator with each ring having a U-shaped cross section defined by inner and outer concentric ring sections 128 and 130, respectively, joined by a radial flange section 132. The inner ring section 128 and the radial flange section 132 each support a thrust bearing raceway 134 formed by a insert. An outer raceway 136 is formed by a cylindrical insert supported in a recess spanning the parting line between the outer ring sections 130. The frame 120 includes two frame sections joined by fasteners, not shown, to form a unitary frame with each frame section having an L-shaped cross section defined by carrier plate section 138 joined with an annular outer flange section 140. An insert 142 is supported at the junction of each of the carrier plate sections 138 and each of the outer annular flange sections 140. The insert has spaced apart truncated conical cavities 144 and in each cavity there is seated a tapered bearing roller 146 for rotation by engagement with the thrust bearing raceway 134. Spaced apart annular cavities 148 are formed in the annular outer perimeter of the carrier plate sections 138 with the cavity in each section 138 aligned at the parting line of the sections forming the frame 120. A cylindrical bearing roller 149 is seated in each of the annular cavities for engagement with the outer bearing raceway 136. Gear teeth 150 are spaced about each of the inner ring sections and mesh with drive gears 152 mounted in a spaced apart relation on a drive shaft 154 coupled to the drive motor 124. The drive motor is preferably a hydraulically power motor supplied with a pressurized hydraulic fluid by a pump through suitable controls per se well known in the art.

Figure 14:
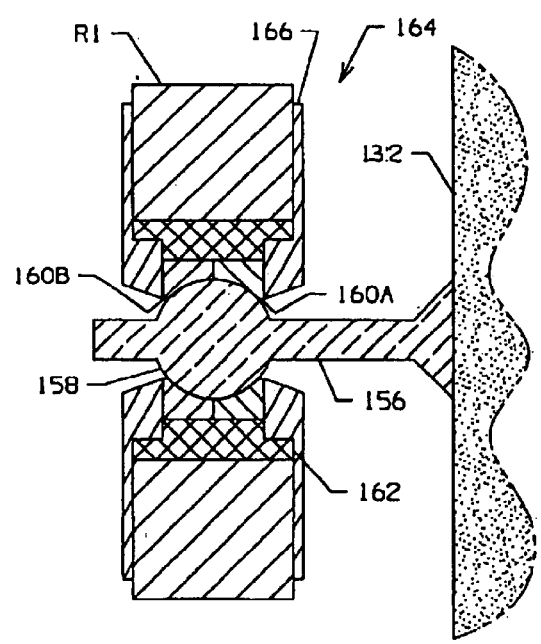
FIG. 14 is a sectional view taken along lines IX—IX of FIG. 10.

The rotator carries at least one preferably two supply reels R1 and R2 containing binders each supported by identically constructed carriers. Each of the reels R1 and R2 are supported by a support arbor 156 extending generally radially from the rotator 122 and driven thereby in an orbit about the axis 126. As shown in FIG. 14, the arbor 156 has an elongated shape and secured at one end by weld metal to the outer face surface of the radial flange section 132. At the mid portion at the arbor there is provided a spherical section 158 engaged in a cavity formed in a half divided bearing blocks 160A and 160B secured by a fastener for pivotally supporting a sleeve 162 having an outer diameter chosen to form a tight fit with the inside diameter of the spool element used to hold a supply reel R1. The binding on reel R1 is tape preferably comprised of a substrate with a layer of adhesive on one surface of the substrate; one suitable and well known product is called duct tape. A binder guide 164 includes a clevis 166 pivotally support at opposite sides of the sleeve 162 by the arbor 156. An elongated guide chute 168 is pivotally secured by a hinge pin to the clevis 166 and form a binder guide substantially bridging the gap between the arbor 156 and the outer peripheral surface of the bundle of conduit ducts traveling along the axis 132. The elongated guide chute 168 is resiliently biased by a spring 170 to urge the binder discharge end of the guide chute toward the axis 126 so that follower guide rollers 172 engage under the resilient force provided by the spring 170 into a rolling contact with the outer periphery of the bundle of conduit ducts as advanced in the internal passageway of the rotator along the axis 132. There are two additional rollers 174 at spaced apart locations along the guide chute 168 to direct the tape or other forms of binders toward the rollers 172 and thus also the bundle of conduit ducts. Reel R2 takes the form of a spool element mounted with a tight fit sleeve 162 and used to hold a supply of metal wire to serve as a selective form of a binder that can be used with or without the use of tape or not used when only the use tape is desired. The use of metal wire will provide the additional function of a signal wire.

The spiral wrapper of the present invention operates to tie multi conduit ducts together to a stable condition and maintain color coding, when desired, of the conduit ducts to meet established requirements. With the conduit ducts tied together, the conduit ducts cannot move out of position and follow a course generally of a straight line when in the bottom of the ditch. This is a very important factor to a construction company that is paying to have conduit ducts placed in the ground. When the metal wire used to tie conduit ducts together as part of the tying procedure and after the conduit ducts are in the ground, the metal wire may be detected by a metal detector at some point in time to reestablish the subterranean placement site before the fiber optic cable is installed in the multi conduit ducts. A metal wire can, if desired, be included along a course in the small gap between conduit ducts in the bundle as shown in FIGS. 4 and 8 to provide the signal function. When the conduit ducts are unwound the reels their placement in the pattern unit will require individual hand feeding to establish the predetermined sites for the ducts particularly including colors of the conduit ducts into the required order. A pull force is generated as the spiral wrapper advances along the conduit ducts and appears as a force causing rotation of the rotator 122. This pull force is factor that is controlled by the control for drive motor 124. The delivery roll unit 34 stabilizes the bundle during the application of the spiral wrap of tape and wire. As the wrapped bundle of conduit ducts emerge from the delivery roll unit 34, the conduit ducts are ready for placement in the ditch. The bundle of conduit ducts can run into an overhead cable shoot on a trenching machine and then into the ditch without further handling of the conduit ducts.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. Apparatus to apply a spiral wrap to a bundle of conduit ducts, said apparatus including: a frame rotatably supporting a rotator driven by a drive for rotation about a central axis extending perpendicular to the plane of rotation by said rotator, said rotator including two rings joined to form a unitary rotator with each ring having an U-shaped cross section defined by inner and outer concentric ring sections joined by a radial flange section, said ring sections forming bearing supports and wherein said frame includes two frame sections joined to form a unitary frame with each frame section having a L-shaped cross section defined by carrier plate section joined with an annular outer flange section; between said inner ring section and said outer flange section for rotatably support of said rotator by said frame, said rotator having an internal passageway of a size sufficient for the internal passage of an elongated bundle of conduit ducts arranged in a preestablished geometrical array along said axis which is generally parallel with the extended length of the elongated bundle of conduit ducts; at least one binder support arbor secured to said rotator for rotatably supporting a supply of an elongated binder, said binder support arbor being driven by said rotator in an orbit about said axis; a binder guide supported by said arbor to extend generally radially toward a geometrical array of conduit ducts as advanced through the internal passageway of said rotator for directing the binder from said binder support arbor to wrap in a spiral fashion about the outer periphery of the bundle of conduit ducts.

2. The apparatus according to claim 1 further including bearings between said annular outer flange section and said outer ring section for rotatably supporting said two rings.

3. The apparatus according to claim 1 wherein said inner ring section and said radial flange section supports a thrust bearing raceway for said bearing.

4. The apparatus according to claim 3 wherein said each of carrier plate sections and each of said outer annular flange sections include spaced apart annular cavities and wherein said apparatus further includes each of cylindrical bearing members seated in said cavities for engaging said thrust bearing raceway.

5. The apparatus according to claim 1 wherein said radial flange section and said outer ring section support a raceway for said bearing.

6. The apparatus according to claim 5 wherein each of said annular outer flange section sections include spaced apart annular cavities and, wherein said apparatus further includes cylindrical bearing members seated in said annular cavities for engaging said bearing raceway.

7. The apparatus according to claim 1 further including: gear teeth spaced about each of said inner ring sections; and drive gears mounted in a spaced apart relation on a drive shaft for meshing with said gear teeth.

8. The apparatus according to claim 2 wherein said binder guide supports guide rollers at spaced apart locations for directing a binder toward said axis.

9. The apparatus according to claim 2 wherein said binder guide further includes a clevis pivotally supported by said binder support arbor, a hinge pin for pivotally supporting an elongated guide chute by said clevis, and a member resiliently urging a free end of said binder guide toward said axis.

10. The apparatus according to claim 9 wherein said binder support guide further includes at least one follower roller rotatably supported by said elongated guide chute at a location for positioning a binder discharge end in rolling contact with a peripheral surface of a geometrical array of conduit ducts advanced along the internal passage way of said rotator.

11. Apparatus to apply a spiral wrap to a bundle of conduit ducts, said apparatus including: a frame rotatably supporting a rotator driven by a drive for rotation about a central axis extending perpendicular to the plane of rotation by said rotator, said rotator having an internal passageway of a size sufficient for the internal passage of an elongated bundle of conduit ducts arranged in a preestablished geometrical array along said axis which is generally parallel with the extended length of the elongated bundle of conduit ducts; at least one binder support arbor secured to said rotator for rotatably supporting a supply of an elongated binder, said binder support arbor being driven by said rotator in an orbit about said axis; a binder guide supported by said arbor to extend generally radially toward a geometrical array of conduit ducts as advanced through the internal passageway of said rotator for directing the binder from said binder support arbor to wrap in a spiral fashion about the outer periphery of the bundle of conduit ducts; and follower rollers rotatably supported by said binder guide at a location for positioning a binder discharge end of said binder guide by rolling contact with a peripheral surface of a geometrical array of conduit ducts while residing in the internal passageway of said rotator.

12. Apparatus to apply a spiral wrap to a bundle of conduit ducts, said apparatus including: a frame rotatably supporting a rotator driven by a drive for rotation about a central axis extending perpendicular to the plane of rotation by said rotator, said rotator having an internal passageway of a size sufficient for the internal passage of an elongated bundle of conduit ducts arranged in a preestablished geometrical array along said axis which is generally parallel with the extended length of the elongated bundle of conduit ducts; at least two binder support arbors secured to said rotator at diametrically opposite sites and driven by said rotator in an orbit about said axis for rotatably supporting a supply of an elongated binder, each of said two binder support arbors having a sleeve for receiving a reel to individually payout adhesive tape; metal wire for selectively forming a spiral wrap about a bundle of conduit ducts, said metal wire being capable of forming a signal wire to locate a subterranean placement site of the conduit ducts; and, a binder guide supported by said binder support arbors to extend generally radially toward a geometrical array of conduit ducts as advanced through the internal passageway of said rotator for directing the binder from said binder support arbors to wrap in a spiral fashion about the outer periphery of the bundle of conduit ducts.

13. Apparatus to spiral wrap a bundle of conduit ducts, said apparatus including:

a tandem arrangement of a pattern unit, a supply roller unit, an applicator unit and a delivery roller unit supported by a base; said pattern unit having a frame supporting vertically spaced apart slats forming horizontal rows of generally rectangular slots subdivided by vertical walls to form rows of discrete apertures for delivering conduit ducts at spatial positions;

each of said supply roller unit and delivery roller unit having a frame supporting spaced apart upper and lower carriers and spaced apart lateral carriers with each carrier rotatably supporting a roller, the rollers of said carriers being positioned by said carriers to define a predetermined geometric passageway bounded by opposed rollers, said supply roller unit organizing conduit ducts received from said pattern unit to conform to said geometric passageway and said delivery roller unit supporting a geometric array of wrapped conduit ducts discharged from said applicator unit; and said applicator unit having a frame rotatably supporting a rotator driven by a drive for rotation about a central axis extending perpendicular to the plane of rotation by said rotator, said rotator having an internal passageway of a size sufficient for the internal passage of an elongated bundle of conduit ducts arranged in a preestablished geometrical array along said axis which is generally parallel with the extended length of the elongated bundle of conduit ducts; at least one binder support arbor secured to said rotator for rotatably supporting a supply of elongated binder, said binder support arbor being driven by said rotator in an orbit about said axis; and, a tape guide supported by said arbor to extend generally radially toward a geometrical array of conduit ducts as advanced through the internal passageway of said rotator for directing the binder from said binder support arbor to wrap in a spiral fashion about the outer periphery of the bundle of conduit ducts.

14. The apparatus according to claim 13 wherein at least one roller supported by one of said carriers includes two roller sections connected in an end to end relation by an articulated joint for defining a geometric passageway as a polygon.

15. The apparatus according to claim 13 wherein said supply roller unit further includes a shaft for interconnecting each of said carriers with said frame, each shaft having a threaded end portion engaged with a member for adjustably positioning one roller supported by the frame connected thereto relative to said geometric passageway.

16. The apparatus according to claim 15 wherein said frame of said supply roller unit includes top, bottom and side limbs each defining elongated windows, a roller positioned by said carrier included an elongated journal extending from each of opposite ends of a roller body for support in a window of a limb.

17. The apparatus according to claim 16 further including bearing assembly for rotatably supporting each of said elongated journals in a window of a limb.

18. The apparatus according to claim 6 wherein said windows in said side limbs are laterally spaced along said axis from windows in said top and bottom limbs.

* * * * *

UNITED STATES PATENT AND TRADEMARK OFFICE
CERTIFICATE OF CORRECTION

PATENT NO.     : 6,789,380 B2
DATED          : September 14, 2004
INVENTOR(S)    : Gene Mellott and Michael Lee Mellott It is certified that error appears in the above-identified patent and that said Letters Patent is hereby corrected as shown below:

Title page,
Item [76], Inventors, change "Michael Lee" to read as -- Michael Lee Mellott --.

Signed and Sealed this

Twenty-sixth Day of October, 2004

JON W. DUDAS
*Director of the United States Patent and Trademark Office*